July 8, 1969 J. S. SCOGGIN 3,454,675
PROCESS FOR PREPARING BLOCK COPOLYMERS OF OLEFINS
Filed March 21, 1966
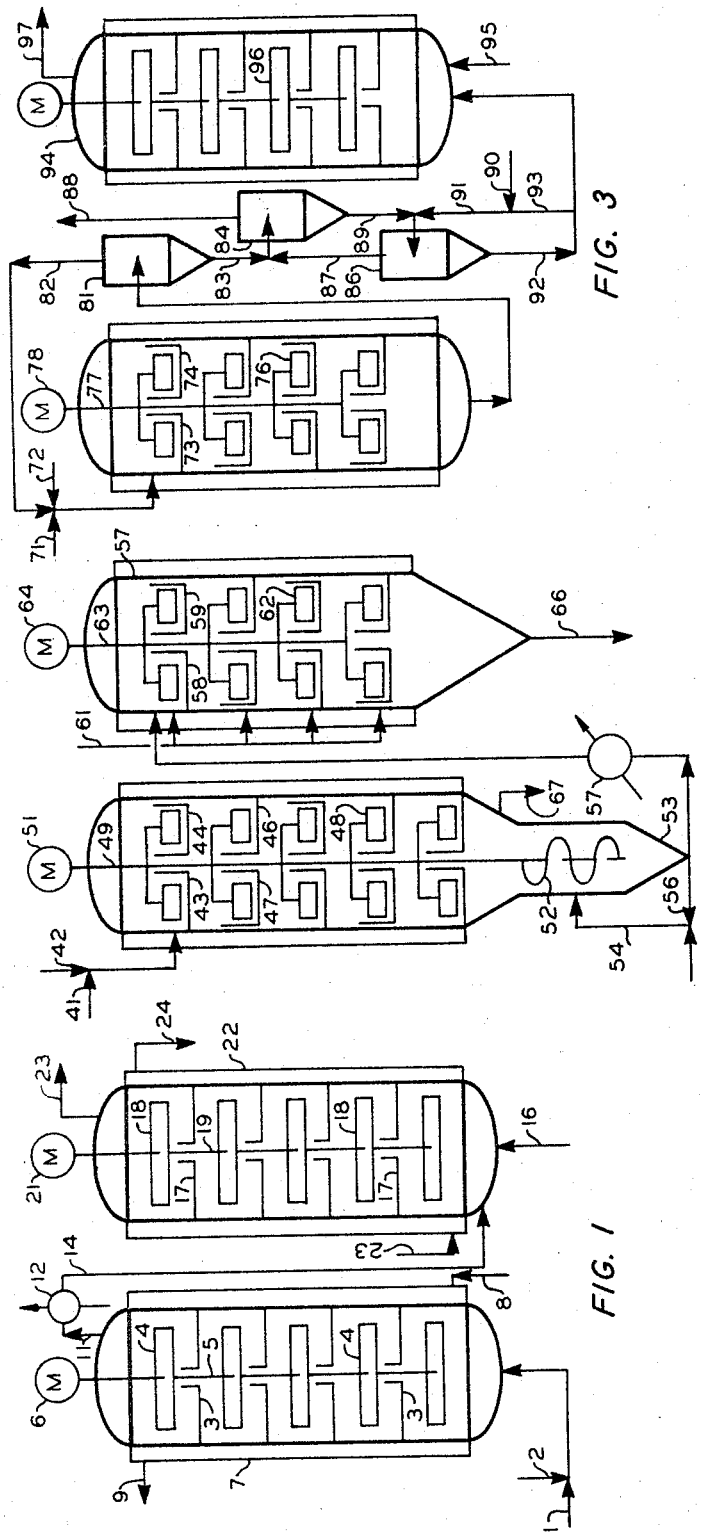
INVENTOR
J.S. SCOGGIN
BY *Young & Quigg*
ATTORNEYS

United States Patent Office 3,454,675
Patented July 8, 1969

3,454,675
PROCESS FOR PREPARING BLOCK COPOLYMERS OF OLEFINS
Jack S. Scoggin, Bartlesville, Okla., assignor to Phillips Petroleum Company, a corporation of Delaware
Filed Mar. 21, 1966, Ser. No. 535,906
Int. Cl. C08f 1/06, 15/04
U.S. Cl. 260—878
7 Claims

ABSTRACT OF THE DISCLOSURE

Block copolymers of olefins are formed by polymerizing one monomer in a multi-compartment reactor, transferring the monomer to a second multi-compartment reactor with or without separation of the first monomer, and polymerizing a second monomer onto the first formed polymer in a second multi-compartment reactor.

---

This invention relates to a process for the polymerization of olefins. In one aspect, it relates to the process of a block polymerization of two olefins by polymerizing the first olefin in one multi-compartmented reactor, and polymerizing the second olefin onto the first in a second multi-compartmented reactor. In another aspect, it relates to the production of block copolymers of mono-1-olefins by polymerizing the first of the mono-1-olefins in an upright cylindrical multi-compartment reactor, transferring the polymer thus formed to a second upright cylindrical multi-compartment reactor where a second mono-1-olefin monomer is added and polymerized onto the polymer formed of the first mono-1-olefin. In another aspect, it relates to the preparation of block copolymers of mono-1-olefins by polymerizing a first mono-1-olefin in a multi-compartment reactor, separating the polymer thus formed substantially from the monomer, and transferring the separated polymer to a second multi-compartment reactor where a second mono-1-olefin is added and polymerized onto the polymer formed in the first reactor.

It is known that mono-1-olefins can be polymerized sequentially in such a manner that the polymer molecules contain distinct polymer segments or blocks which are non-identical and which contribute significantly to the properties of the total polymer. The preparation of block copolymers is described in British patent specification No. 889,659 of Phillips Petroleum Company. One type of polymer which can be made in accordance with the procedure described is a polymer in which each block is made up essentially of only one type of monomer. In this case the polymerization of each monomer is carried out in the substantial absence of a different monomer. It has been found that very valuable properties can be obtained by copolymerizing mono-1-olefins in this manner and that similar results cannot be realized by making physical blends of different homopolymers based on the same monomers and combined in the same proportions. For example, block copolymers of ethylene and propylene can be prepared so that the polymer molecules contain a polyethylene block and a polypropylene block. This product has much better impact strength and low temperature properties than does a physical blend of polyethylene and polypropylene of the same proportions of ethylene and propylene. Additionally, a polymer of intermediate properties can be made by polymerizing the second monomer onto the polymer first formed in the presence of a small amount of the first monomer. This process obviates the necessity of substantially separating the first formed polymer from its monomer prior to contact with the second monomer. In such a process, the amount of the second monomer is very large in relation to the amount of the first monomer present in the second stage of the polymerization so that the polymer blocks added will be predominantly of the second monomer.

Although block copolymers of the type described above can be readily prepared on a laboratory scale, in continuous commercial operations many problems are involved which are not present in conventional processes directed to the formation of homopolymers or random copolymers of the same monomers. One of the difficulties lies in obtaining complete removal of unreacted monomer or consumption of all of the monomer which is used first so that it will not be present in the system when the second monomer is polymerized. Another very critical problem is that of maintaining the first polymer and the catalyst associated therewith in an active state so that when the second monomer is polymerized, the second block is added to the molecules of the first polymer. If the first polymer is inactivated during the procedure in which the monomers are being changed, the result obtained is merely a physical blend of independent homopolymer molecules so that the advantages of block copolymerization as discussed above are not realized.

It has been proposed that processes of this type could be made continuous and conducted in an economical fashion if a series of reactors were used for each of the two polymerization steps. However, it was discovered that the use of two reactors in series, either of the "pipe loop" type or of the tank type was unsatisfactory because of short circuiting of the catalyst in the first reactor, with the result that some of the catalyst had a very short residence time in the reactor.

It is, therefore, an object of my invention to provide a continuous process for the formation of block copolymers of olefins. It is a further object of my invention to provide a continuous process for block copolymerization wherein short circuiting of catalyst is prevented. It is still a further object of this invention to provide a process for the production of ethylene-propylene block copolymers in an economical continuous fashion.

Other aspects, objects and the sereval advantages of this invention are apparent to one skilled in the art from a study of this disclosure, drawing, and the appended claims.

According to my invention, a first mono-1-olefin is introduced to a reactor containing a plurality of stirred reaction chambers in series so that the monomer and catalyst introduced with the monomer progress serially from one section to another under polymerization conditions, and the polymer thus formed is transferred to a second similar multi-compartment reactor, where a second mono-1-olefin is polymerized onto the polymer first formed. In one embodiment, the first formed polymer is transferred to the second reactor along with a small quantity of the first mono-1-olefin monomer, and the second polymerization will cause a mixture of polymers of both the first and the second mono-1-olefins to be polymerized onto the first formed polymer. In other embodiments, the first mono-1-olefin monomer is substantially removed from the first formed polymer before the second mono-1-olefin monomer is polymerized onto the polymer.

The present invention is of significant value as applied to the block copolymerization of ethylene and propylene. The invention can be used, however, for the block copolymerization of any mono-1-olefin having from two to eight carbon atoms, such as 1-butene, 1-pentene, or methyl-1-pentene, 1-octene, and the like.

The catalyst which is employed can be any of the catalyst systems commonly referred to as coordination polymerization catalysts. Such catalysts are formed from at least two components, one of which is a compound of a metal selected from Groups IV–B, V–B, VI–B or VIII of the Periodic Chart, as presented in Handbook of Chemistry and Physics, Chemical Rubber Company, 45th edition, 1964, page B-2, and the second component is a reducing agent, normally an organometal, metal hydride, or metal of Groups I-A, II-A or III-A. These catalyst systems are well known and many examples are available from the literature. Examples of component combinations which are representative include n-butyllithium and titanium tetraiodide; dicyclopentylzinc and titanium butoxide; ethylmagnesium bromide and titanium hydride; triethylaluminum or triphenylaluminum and molybdenum pentachloride; sodium hydride, barium hydride or gallium hydride and iridium chloride; sodium, magnesium or aluminum and vanadium tetrachloride, and the like.

The catalyst systems used in this invention must, of course, be capable of polymerizing mono-1-olefins in mass polymerization and under conditions such that solid polymer is produced in particle form. Preferably the catalyst components include a metal salt and an organometal compound as the reducing agent. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valance of the metal M, and (b) a halide of a metal of Group IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ include triethylaluminum, triisobutylaluminum, triphenylaluminum, triethylgallium, tricyclohexylgallium, tri-n-butylindium, triethylthallium, diethylaluminum hydride, ethylaluminum dichloride, diethylaluminum chloride, phenylgallium dibromide, eicosyl aluminum diiodide, di-(3-phenyl-1-methylpropyl) indium chloride, and the like.

Preferably the metal salt is a metal halide of a Group IV-B metal, namely titanium, zirconium, hafnium or germanium. These solids include both the tri- and tetrachlorides, bromides and iodides and can be used individually or as mixtures of two or more metal halides. The preferred salt is titanium trichloride and the preferred catalyst system is diethylaluminum chloride plus the reaction product of aluminum and titanium tetrachloride, said reaction having the approximate formula

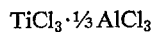

$$TiCl_3 \cdot \tfrac{1}{3} AlCl_3$$

In these catalyst systems, the mole ratio of the reducing agent to the metal salt is usually in the range of 1:1 to 10:1, and preferably in the range of 2:1 to 5:1. Concentration of the catalyst in the polymerization zone is normally in the range of 0.01 to 5 weight percent based on the monomer charged to that zone, although greater or lesser amounts can be used. In the polymerization of the first monomer, an inert liquid hydrocarbon diluent is used. Preferably this is a saturaated hydrocarbon including the paraffins and cycloparaffins having from 3 to 12 carbon atoms per molecule such as propane, n-butane, n-hexane, n-heptane, n-dodecane, isooctane, cyclopentane, cyclohexane, and the like.

Polymerization conditions are maintained in both polymerization stages so that the polymer is formed as a solid particle and the reaction mixture is a slurry of solid polymer and liquid diluent or liquefied monomer. Suitable polymerization temperatures can vary from about 0 to 200° F. and are preferably maintained in the range of about 90 to 150° F. The pressure is that required to maintain the reaction medium in the liquid phase although higher pressures can be used.

The reactors used in the process of my invention can be any type of reactor tank which contains a plurality of compartments and having the inlet and outlet means so arranged that materials introduced into the reactor will necessarily pass through each of the said compartments before emerging through the outlet. By means of such an arrangement, short circuiting of either monomer or catalyst is prevented. The reactor is conveniently an upright cylindrical tank having a plurality of horizontal baffles forming a series of compartments, with stirring means in each of said compartments. A reactor of the type which can be conveniently used in the practice of my invention is described and claimed in U.S. Patent 3,212,859 (Oct. 19, 1965) to Mitacek. A reactor of the general type described can be operated liquid full, in which case catalyst and monomer may be introduced at the bottom of the tank, and polymer removed from the top.

On the other hand, it is possible to reverse the flow of reaction through the reactor by operating with only a pool of liquid on each baffle. The baffles are so arranged that liquid and solid from each baffle will fall onto the baffle below. The stirring means are arranged to agitate the polymer slurry between baffles. In this case the reactor will contain a series of individual pools of slurry flowing serially into each other down the length of the reactor. As stated above, my invention can be practiced either by removing the polymer from the first reactor as a slurry in the monomer, and conducting this directly to the second reactor, or the polymer can be substantially separated from the first monomer so that the second polymerization will take place in the substantial absence of the first monomer. Various means can be used to separate the polymer from the monomer. For example, a series of cyclone separators can be used for concentration and washing of the polymer as is disclosed and claimed in my Patent 3,176,000, issued Mar. 30, 1965. Another method of separating the polymer from the monomer is by compacting suspended solids in an auger, as for example, as shown in U.S. Patent 3,203,766 to Mudd et al., issued Aug. 31, 1965. Other methods of separation could be used as well, as for example, centrifugation or filtration.

It is possible to operate zones of the compartmented reactor at different temperatures by providing separate cooling systems on the jacket of each compartment. Thus it is possible to control the molecular weight distribution of the polymer produced.

It is also possible to operate zones of the compartmented reactor at different monomer or comonomer concentrations, thus providing a control over molecular weight distribution.

FIGURE 1 shows an embodiment of my invention wherein there is no separation of the polymer from the first monomer prior to the second polymerization stage. FIGURE 2 shows another embodiment wherein the first monomer is substantially separated from the polymer before the polymer is conducted to the second polymerization stage. FIGURE 3 is a different embodiment of my invention wherein the first reactor operates as an overflow reactor, the polymer is separated from the monomer by means of serial cyclones, and the second reactor operates as a liquid full reactor.

In the embodiment in FIGURE 1, I have shown the monomers being introduced at the bottom of the reactors, and the reactors operating liquid full. Liquid propylene is introduced to the reactor through line 1, and catalyst through line 2. These materials introduced at the bottom of the reactor will flow upwardly through each of the compartments formed by baffles 3. The reactor is maintained under conditions suitable for the polymerization of propylene, and thus polymer will be formed as the liquids progress upwardly. There will be sufficient upward flow of liquids to carry the solid polymer particles thus formed to the top of the reactor. Within each of the compartments in the reactor, agitation is provided by means of stirring paddles 4 which are connected through shaft 5 to motor 6. Temperature conditions are maintained within the reactor by means of cooling jacket 7. Coolant is introduced to this jacket through inlet 8 and removed through outlet 9.

A flow of proylene monomer containing suspended polypropylene is removed from the top of the reactor through line 11. This flow is taken through cooling jacket 12 in order to reduce the temperature of the mixture to the proper polymerization temperature condition for the second stage of polymerization. The polypropylene in propylene slurry is introduced to reactor 13 through line 14 and intermingles with ethylene introduced through line 16. The ethylene so introduced will generally be gaseous, and will be brought into the reactor by means of a sparge ring. The ethylene and some of the propylene will polymerize onto the polypropylene particles as the liquids flow upward through the reactor. In this reactor, as in the first reactor, there are a number of compartments formed by baffles 17. Stirring of each compartment is provided by stirring paddles 18, connected through shaft 19 to motor 21. Temperature conditions in the reactor are controlled by cooling jacket 22. Coolant is introduced to this jacket through line 23, and removed through line 24. The block copolymer product is removed from the top of reactor 13 through line 23. This block copolymer is really a mixed block copolymer because both propylene and ethylene have polymerized simultaneously in reactor 13 onto the pure polyproylene blocks formed in reactor 7. It is called a block copolymer because it contains polyproylene blocks but it probably does not contain pure polyethylene blocks; these are made according to FIGURES 2 and 3.

The embodiment shown in FIGURE 2 shows a downward flow of reactants through a liquid-filled reactor. It also shows separation of the first monomer from the polymer before the polymer is conducted to the second polymerization stage. In this embodiment, propylene is introduced to the top of the reactor through line 41 and catalyst through line 42. Liquid propylene and solid polymer concentrate above baffle plate 43 until sufficient height is attained to overflow weir 44. Overflow slurry will fall onto baffle 46 and be collected there until it attains sufficient height to overflow weir 47. In like fashion, liquid slurry will progress to each baffle plate successively until reaching the bottom of the reactor. In each of the compartments, agitation of the slurry will be provided by stirring paddles 48 which are connected by shaft 49 to motor 51. The stirring paddles will be run at sufficient speed to maintain the solid polymer particles formed in suspension so that the polymer particles will overflow to weirs with the liquid flow. At the bottom of the reactor, the slurry of polypropylene in propylene will be conveyed downwardly by auger 52. This auger, in conjunction with restriction 53, will serve to form a compact polymer mass which will express the liquid propylene upwardly. This expression, and the removal of the propylene monomer from the polymer, can be aided by the introduction of an inert solvent such as isobutane through line 54 as shown. Isobutane, liquid propylene, catalyst, and soluble polymer which are washed from the compacted mass are removed from the reactor through line 67. This slurry can be treated elsewhere for separation of these various components. The polymer removed from the bottom of the settling leg will be almost 100 percent solid polypropylene. The polypropylene particles will be slurred with an inert diluent introduced through line 56, and conducted through cooling jacket 57 where the slurry is cooled to the proper temperature for the second stage of polymerization. The cooled slurry of polymer and diluent is introduced to reactor 57 at the top, where it will fall on baffle plate 58. The baffle plates of this reactor are provided with overflow weirs 59, as in the previous reactor. Gaseous ethylene is introduced to each baffle plate through line 61, and is conveniently distributed around the baffle plate by means of a sparge ring. Agitation of each compartment of this reactor is provided by stirring paddles 62 which are connected by shaft 63 to motor 64. The copolymer formed in this reactor is removed through line 66 at the bottom of the reactor. As in the previous embodiment, the two reactors are conveniently provided with cooling jackets for maintenance of the desired temperature within the reactors.

While FIGURE 2 shows the polymer separation means of the first reactor as being a settling leg at the bottom of the reactor, it should be recognized that a separate settler could be used equally well. Furthermore, the polymer could be washed free of catalyst residues by means of a proylene wash through line 54, rather than an isobutane wash as disclosed above. This would, of course, result in a higher propylene content in the polymer than with the isobutane wash.

In the embodiment I have shown in FIGURE 3, propylene monomer is introduced through line 71, and catalyst through line 72 to the top of an overflow reactor similar to that shown in FIGURE 2. The entering liquid will fall on baffle plate 73, and accumulate until it reaches sufficient polymer concentration to overflow weir 74. The polymer will thus proceed downwardly through the reactor by overflowing the weirs at successive levels. Agitation at each level is provided by stirring paddles 76 connected through shaft 77 to motor 78. The slurry of polypropylene in propylene taken from the bottom of the reactor through line 79 is introduced to first cyclone 81, where it is concentrated to about 50 weight percent solids. The overhead from this cyclone, consisting of propylene soluble catalyst, and soluble polymer is taken through line 82 and returned to the reactor. The concentrated polymer slurry is removed from the cyclone through line 83 and conducted to second cyclone 84. The polymer slurry is contacted in this cyclone with the overhead product from third cyclone 86 through line 87. The overhead from cyclone 84 consists of propylene and some inert diluent present in the overhead from the third cyclone. This overhead from cyclone 84 is taken through line 88 for fractionation and reuse of the components. The polymer slurry from cyclone 84 is taken through line 89 to third cyclone 86. In this cyclone it is contacted with an inert diluent, such as isobutane, introduced through line 90 and 91. The overhead from cyclone 86 is returned to second cyclone 84 as described above. The polymer slurry from cyclone 86, which is now substantially propylene free, is taken through line 92 and is joined with additional isobutane from line 93 before being introduced to reactor 94. Ethylene is introduced to this reactor through line 95. In the embodiment demonstrated, I have used a liquid full type reactor for the block polymerization of ethylene; substantially as described in FIGURE 1. The polypropylene slurry, and the ethylene introduced from the bottom of reactor 94, will progress upwardly as polymerization occurs, being agitated within each compartment by stirring paddles 96. The copolymer product formed in reactor 94 consisting of essentially 100 percent blocks of polypropylene and polyethylene is removed overhead through line 97.

In the embodiments as discussed above, the first polymerization reaction has been the polymerization of propylene, and the second reaction has been the addition of ethylene polymer to the propylene already formed. It should be recognized that these two reactions could be reversed, or that two entirely different monomers could be copolymerized by the process of my invention. Furthermore, although the propylene polymerization as discussed above has been described as being without a diluent, it is within the scope of this invention to have an inert diluent present during the polymerization. It is further within the scope of this invention to form mixed polymers, as for example forming an ethylene-propylene copolymer in the first reactor, and subsequently adding one of those two monomers, or an entirely different monomer in the second reactor.

EXAMPLE

In FIGURE 1, 132,846 pounds per stream day of propylene containing 6,930 pounds of propane and 24 pounds of ethylene are fed via stream 1 to the primary reactor. Stream 2 consists of 46 pounds per stream day titanium trichloride complex, 154 pounds per stream day n-pentane, and 36 pounds per stream day of diethyl-aluminum chloride. The primary reactor is operated at 130° F., 625 p.s.i.a., and approximately 3 hours polymer residence time. Stream 11 composition in pounds per stream day is: 84,500 pounds propylene, 6,930 pounds propane, 154 pounds pentane, 2,850 pounds soluble polymer, 45,520 pounds particulate polypropylene, 46 pounds titanium trichloride complex; and 36 pounds of diethylaluminum chloride.

The secondary reactor 13 is operated at 60° F., 615 p.s.i.a., and approximately 1 hour residence time. Stream 16 composition in pounds per stream day is: 16 pounds ethane, 19,710 pounds ethylene, 4,950 pounds propylene, and 211 pounds propane.

Composition of stream 23 in pounds per stream day is 16 pounds ethane, 10,830 pounds ethylene, 94,300 pounds propylene, 7,571 pounds propane, 154 pounds pentane, 3,630 pounds soluble polymer, 56,810 pounds particulate copolymer, 46 pounds titanium trichloride complex and 36 pounds diethylaluminum chloride. The copolymer produced is a block copolymer having high flexural modulus and low temperature impact strength.

Examples for FIGURES 2 and 3 are the same as above with the exception that substantially all of the propylene in the feed to the secondary reactor is displaced with a diluent such as isobutane and the ethylene feed contains no appreciable propylene. Polymers produced in FIGURES 2 and 3 are substantially 100 percent block polymers having high impact strength at low temperatures and high flexural modulus.

Reasonable variation and modification are possible within the scope of the foregoing disclosure, the drawing and the appended claims to the invention, the essence of which is that block copolymers of monoolefins are formed by polymerizing one monoolefin in a first multi-compartment reactor, transferring the polymer thus formed to a second multi-compartment reactor where a second mono-1-olefin is polymerized onto the first formed polymer.

I claim:

1. A continuous process for forming block copolymers from different mono-1-olefins which comprises:
    (a) introducing a first mono-1-olefin monomer and catalyst into the inlet end of first elongated polymerization reaction zone, said first zone being divided into a plurality of polymerization chambers or compartments arranged in series and with the further proviso that each chamber is provided with an agitator so that the polymerization mass is intimately mixed and moved serially through said chambers from the inlet end of the reaction zone to the outlet end of the reaction zone;
    (b) subjecting said first monomer and catalyst to polymerization conditions of temperature in each of said compartments to form a reaction mass comprising homopolymer, unreacted monomer and catalyst, said polymerization mass being serially moved through each of said polymerization chambers from the inlet end to the outlet end of said first reaction zone;
    (c) agitating the polymerization mass comprising unreacted monomer, catalyst and homopolymer produced in each chamber so as to obtain intimate contact between monomer and catalyst so that bypassing of catalyst within the polymerization zone is substantially prevented;
    (d) withdrawing from the outlet end of said reaction zone a reaction mass comprising homopolymer, unreacted monomer and catalyst;
    (e) passing the reaction mass withdrawn from said first reaction zone in step (d) along with a second mono-1-olefin monomer to the inlet end of a second elongated polymerization reaction zone which is also divided into a plurality of polymerization chambers or compartments arranged in series;
    (f) subjecting the polymerization mass introduced into said second reaction zone and second monomer to polymerization conditions and agitation in each of the chambers in said second reaction zone to form a second polymerization mass comprising block copolymer, unreacted monomer and catalyst under conditions such that the polymerization mass is moved from the inlet end of said second reaction zone to the outlet end of said second reaction zone and through each of said agitated compartments whereby bypassing of catalyst within said second zone is substantially prevented and a block copolymer is formed; and
    (g) withdrawing from the outlet end of said second reaction zone a polymerization mass comprising block copolymer, unreacted monomer and catalyst.

2. A process according to claim 1 wherein each of said reaction zones is an upright cylindrical zone and wherein the monomers are introduced into the base of each reaction zone and each of the reaction zones is operated liquid-full with the polymerization mass being removed from the top of each reaction zone.

3. A process according to claim 1 wherein there is downward flow of reactants through each reaction zone which are operated liquid-full and further wherein there is separation of the first monomer from the polymerization effluent removed from the outlet end of said first reaction zone by compacting the polymerization mass to remove unreacted first monomer therefrom before transfer to the second reaction zone.

4. A process according to claim 1 wherein the reactants move downwardly through each of the elongated reaction zones which are operated liquid-full and the effluent from the first reaction zone is subjected to centrifugal force in a plurality of cyclone separation zones to separate unreacted first monomer therefrom by gravitational separation prior to contacting with the second monomer in a second elongated polymerization reaction zone.

5. A process according to claim 1 wherein said first monomer is propylene and said second monomer is ethylene.

6. A process according to claim 3 wherein separation is aided by the addition of an inert diluent during compaction.

7. A process according to claim 4 wherein an inert diluent is added to at least one of said cyclone separation zones to aid separation.

References Cited

UNITED STATES PATENTS

| | | | |
|---|---|---|---|
| 3,318,976 | 5/1967 | Short | 260—878 |
| 3,347,955 | 10/1967 | Renaudo | 260—878 |

SAMUEL H. BLECH, *Primary Examiner.*

M. J. TULLY, *Assistant Examiner.*

U.S. Cl. X.R.

23—285, 288; 260—93.7, 94.9, 95